United States Patent [19]

Kada et al.

[11] Patent Number: 4,541,062
[45] Date of Patent: Sep. 10, 1985

[54] METHOD OF INTERLOCKINGLY CONTROLLING A ROBOT AND POSITIONER

[75] Inventors: Hironosuke Kada; Teruyoshi Sekino; Hirogazu Murayama, all of Fujisawa; Iazuaki Tatsumi, Kobe; Tsudoi Murakami, Ashiya, all of Japan

[73] Assignee: Kabushiki Kaisha Kobe Seiko Sho, Kobe, Japan

[21] Appl. No.: 488,808

[22] Filed: Apr. 26, 1983

[51] Int. Cl.³ .................... G06F 15/46; G05B 19/42
[52] U.S. Cl. ........................... 364/513; 219/124.34; 318/568; 364/193; 901/3; 901/6; 901/10; 901/42; 901/47
[58] Field of Search ............... 364/513, 474, 475, 477, 364/191–193, 167–171; 901/3–6, 10, 42, 47; 414/730; 318/576, 568; 219/124.34, 124.1, 124.2, 124.4

[56] References Cited

U.S. PATENT DOCUMENTS

| | | | |
|---|---|---|---|
| 4,014,495 | 3/1977 | Oda et al. | 901/6 X |
| 4,249,062 | 2/1981 | Hozumi et al. | 901/6 X |
| 4,255,643 | 3/1981 | Balfanz | 901/10 X |
| 4,280,137 | 7/1981 | Ashida et al. | 901/42 X |

Primary Examiner—Joseph Ruggiero
Attorney, Agent, or Firm—Oblon, Fisher, Spivak, McClelland & Maier

[57] ABSTRACT

A method of interlockingly controlling a robot and a positioner which includes operating manually or automatically a teaching roller along a weld line of a workpiece fixed to a rotatable positioner, teaching the position of the weld line, storing the positional data thereby obtained, and performing a welding operation automatically on the basis of the stored data during playback, in which, during teaching, the positioner is rotated at any desired speed, the robot is moved manually or automatically while maintaining a welding torch in a proper welding position with respect to the weld line and positional data on each shaft of the robot and that on a rotating shaft of the positioner are stored each time the teaching roller advances by a predetermined distance, while during playback the welding speed is kept constant by controlling the moving speed of the robot and the rotating speed of the positioner simultaneously while controlling a relative positional relation between the positioner and the robot on the basis of the positional data on each shaft of the robot and that on the rotating shaft of the positioner.

4 Claims, 18 Drawing Figures

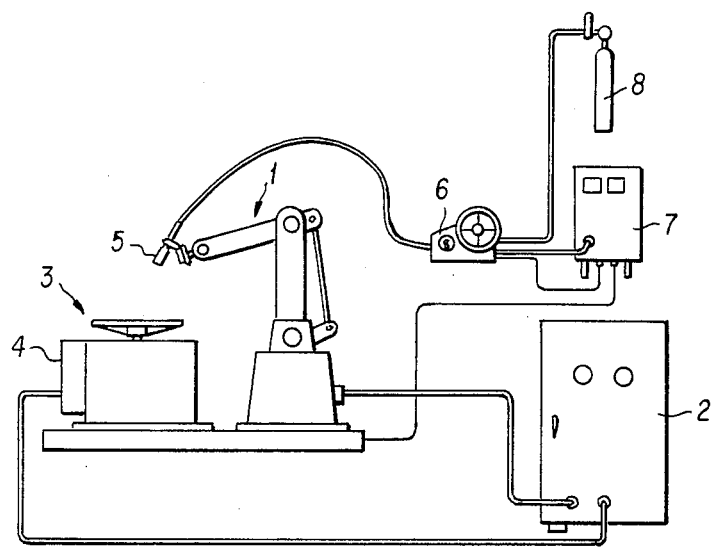
FIG. 1 PRIOR ART
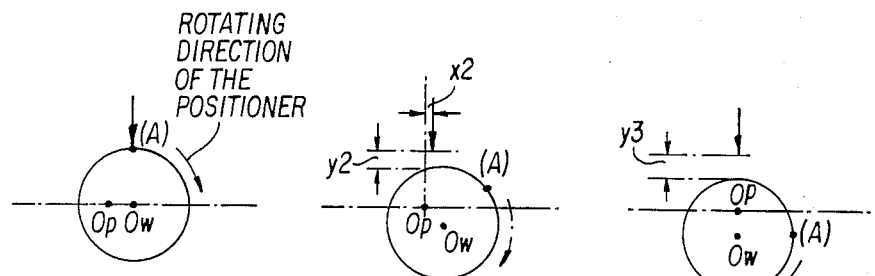
FIG. 2a PRIOR ART     FIG. 2b PRIOR ART     FIG. 2c PRIOR ART
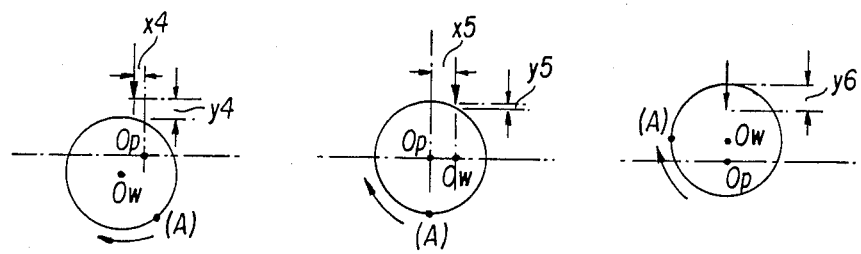
FIG. 2d PRIOR ART     FIG. 2e PRIOR ART     FIG. 2f PRIOR ART

METHOD OF INTERLOCKINGLY CONTROLLING A ROBOT AND POSITIONER

BACKGROUND OF THE INVENTION

1. Field of the Invention

The present invention relates to a method of interlockingly controlling a robot and a positioner with each other and, more particularly, to a method wherein positional data on a teaching/playback robot for welding and on a positioner carrying a workpiece thereon are received thereby permitting a welding operation to proceed while allowing for control of position and speed interlockingly during playback.

2. Description of the Prior Art

FIG. 1 schematically illustrates a welding robot system using a positioner, in which reference numeral 1 denotes a body of a multi-articulate type teaching/playback robot; numeral 2 denotes a robot control panel for controlling the robot body 1; 3 denotes a positioner to which is fixed a workpiece; 4 a positioner control panel for providing a control instruction to the positioner 3 on the basis of a command provided from the robot control panel 2; 5 a welding torch; 6 a welding wire feed device; 7 a welding power source; and 8 a shielding gas. According to the prior art, when performing playback (welding) while moving the robot body 1 and the positioner 3 interlockingly with each other in such a system, first a workpiece is positioned and fixed in a welding position by means of the positioner 3, then after stopping the positioner 3, the robot body 1 is driven to perform a welding operation, and when the welding operation is over and the movable part of the robot body 1 has been retracted to a position not contacting the workpiece, the positioner 3 positions the next workpiece in the welding position. Thus, the welding operation is performed while moving the robot body 1 and the positioner 3 in an alternately manner, that is, the control is not under simultaneous operation of the positioner 3 and the robot body 1.

Moreover, in the case of welding not a simple linear weld line but, for example, a circumferential weld line (particularly when the welding torch 5 is to be faced downward during welding), it is necessary to perform welding while rotating the work. However, according to the prior art, only when the weld line is circular and a workpiece is attached to the positioner 3 so that the center of this circle and the center of rotation of a turntable of the positioner 3 coincide with each other, it has been possible to perform welding while moving the positioner 3 during the welding operation. In this case, the robot body 1 merely remains stationary while maintaining the position and angle of the torch 5 and the turntable of the positioner is merely rotating at a speed determined by the diameter of the weld line (circular) so that the moving speed of the weld line relative to the torch 5 becomes the welding speed. Control is merely such that the rotation of the positioner is started at a predetermined speed with an arc start signal and stopped with a welding end signal. During welding, the robot body 1 and the positioner 3 are maintained under separate control with respect to their relative positional relation and operating speed.

In case the center of rotation of the turntable and the center of the weld line circle deviate from each other, such separate control causes the following drawbacks, as shown in FIG. 2, first, the torch angle relative to the weld line changes, and second, because the amount of deviation in and y directions changes momentarily, the torch may move away too much from the weld line or come too close thereto resulting in contact with a workpiece W. In FIG. 2, the arrow indicates a torch in a fixed position, and FIG. 2(a) shows the case where point (A) is in a position of 0° with respect to a workpiece center $O_w$, and similarly FIG. 2(b) 45°, (c) 90°, (d) 135°, (e) 180° and (f) 270°. The mark $O_p$ indicates the center of rotation of the positioner, and the workpiece W rotates about this point $O_p$.

In case the weld line is not circular but instead a complicated curved line such an ellipse or a hyperbola, the above-mentioned drawbacks appear more conspicuously.

According to the conventional teaching method, moreover, a relative position between the robot body and the positioner can be controlled only approximately, and further, as shown in FIG. 2, control of the welding speed is impossible because the radius of gyration of the weld line varies momentarily. This is true especially of a PTP type teaching/playback robot.

In teaching a circumference with a PTP type robot, it is here assumed that, as shown in FIG. 3, a teaching occurs of the position of the torch (shown in arrow in the figure) and that of the positioner P in initial state ① and then a similar teaching occurs in state ②. In playback, as shown in FIG. 4, the positional relation between the positioner P and the torch is correct in state ① and state ②, but on the way from state ① to state ② the target position of the torch deviates from its proper position, as indicated at $d_2$, $d_3$, $d_4$ and $h_2$, $h_3$, $h_4$. The radius of gyration r of the workpiece W also changes from $r_1$ to $r_2$, $r_3$, $r_4$, $r_5$. In order to attain a constant welding speed, it is necessary to detect the radius of gyration r continuously and control the rotating speed of the positioner on the basis of the detected r. However, it is difficult to detect the radius of gyration r and hence difficult to control the welding speed. In the illustrations of FIGS. 3 and 4, the positioner P is rotated by 90-deg. But, even in case this angle is made smaller and teaching occurs about many points, the relative positional relation between the positioner P and the torch is merely approximate and hence the welding speed is also merely approximate.

SUMMARY OF THE INVENTION

The present invention has been effected in view of the above-mentioned various drawbacks, and it is the object thereof to provide a method wherein positional data on both robot and positioner are obtained at the time of teaching operation to thereby permit welding to proceed while providing a relative positional control and speed control for the robot and the positioner during the welding operation.

An embodiment of the present invention will be described below the reference to the accompanying drawings.

BRIEF DESCRIPTION OF THE DRAWINGS

FIG. 1 is a schematic illustration of a welding robot system;

FIGS. 2(a)-(f) are views illustrating different off-center cases;

FIGS. 8(a) to 10(b) are views showing concrete examples using the embodiment of the invention, in which;

FIG. 8(a) shows butt welding and FIG. 8(b) shows its locus;

FIG. 10(a) shows a fillet welding of an elliptical cylinder and FIG. 10(b) shows its locus.

DETAILED DESCRIPTION OF THE PREFERRED EMBODIMENT

A robot system to which is applied an embodiment of the present invention is of substantially the same construction as that shown in FIG. 1, and comprises a robot body, a positioner provided with a rotatable turntable, a control device and peripheral equipment for welding.

Figure 3:
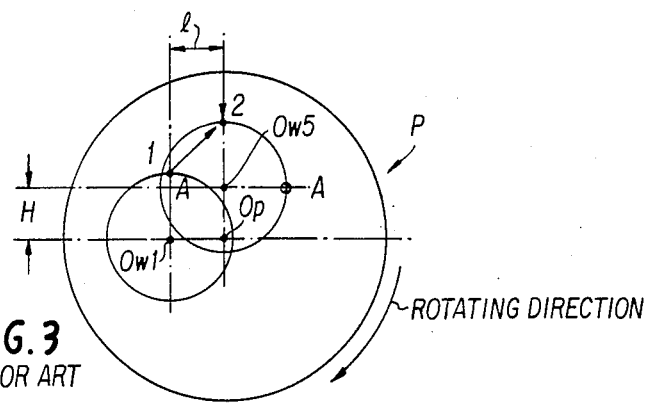
FIG. 3 is a view illustrating an off-center case in a PTP system.
Figure 4:
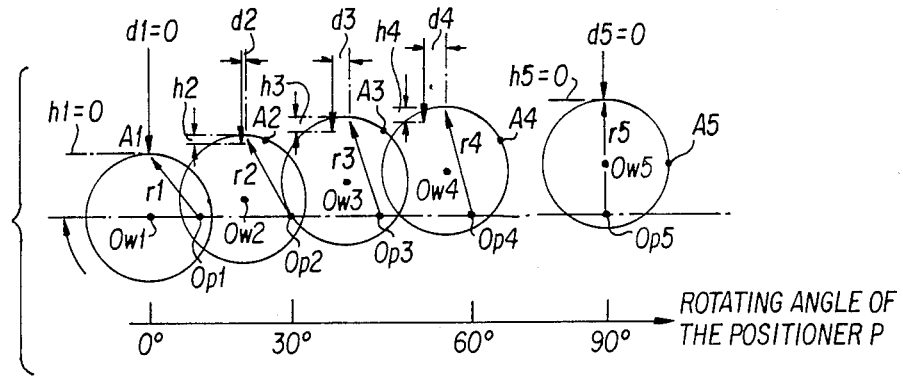
FIG. 4 is a view illustrating the positional relationship between a torch and a positioner in FIG. 3.
Figure 5:
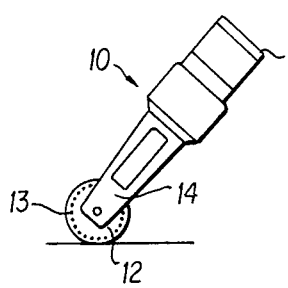
FIG. 5 is a side view of a teaching roller.

The robot body is a multi-articulate teaching/playback robot having six shafts (six degrees of freedom) $S_1$ to $S_6$. These shafts, which are driven by a servomotor, are each provided with a position detector. Position data obtained by the position detectors are fed to a control device. The robot body is so constructed as to be smoothly manually movable during teaching. To the fore end of a wrist portion of the robot body are attached both a welding torch and a teaching roller. The teaching roller is for storing the position of a weld line by being moved along a weld line of a workpiece manually or automatically. This teaching roller 10 is as shown in FIG. 5, that is, when the operator holds a grip portion 11 and rotates a roller 12 along the weld line, an electrical pulse is produced each time one of through holes 13 formed in the roller 12 at predetermined intervals passes across an optical axis of a photo detector 14, and thus distance is converted to an electrical signal. Further details are disclosed in Japanese Patent Publication No. 37768/1980 entitled "Method of Controlling the Speed of Industrial Robot" filed by the applicant of the present invention. which corresponds to U.S. Pat. No. 4,105,937. The teaching roller 10 is rolled along the weld line for teaching and position data is sampled at each predetermined distance. The sampled position data is stored in a main memory means provided within a control device.

The control device includes a computer, particularly a microcomputer, as a controlling and computing means, and a main memory, e.g. a floppy disc device, for storing positional and other data and program. It is further provided with an interface circuit for various device systems. Further attached to the control device is a small operation box for setting various data manually, for example.

Figure 6:
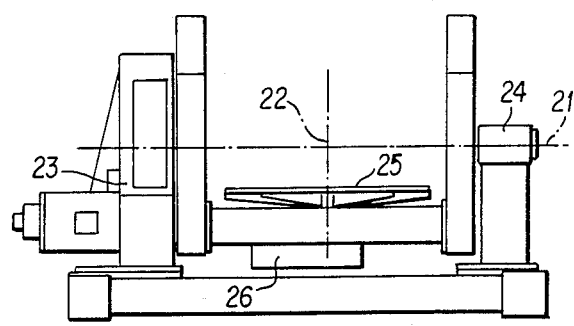
FIG. 6 is a schematic front view of an example of a positioner.

The positioner, as exemplified in FIG. 6, has two shafts 21 and 22. The shaft 21, which is driven by a drive portion 23, functions to tilt a turntable 25 between the drive portion and a support portion 24, while the shaft 22, which is driven by a drive portion 26, functions to rotate the turntable 25. The drive portion 26 for the shaft 22 comprises a servomotor and it is kept under servo control in accordance with a control command provided from the foregoing control device. To the shaft 22 is attached a position detector such as, for example, an optical rotary encoder. The position detector communicates positional data on shaft 22 to the control device at all times. That is, the shaft 22 for rotating the turntable corresponds to one additional shaft in the system in addition to the six shafts $S_1$–$S_6$ of the robot body.

In the above welding robot having one additional control shaft for controlling the robot body and the positioner interlockingly with each other, teaching is performed in the following manner.

Figure 7:
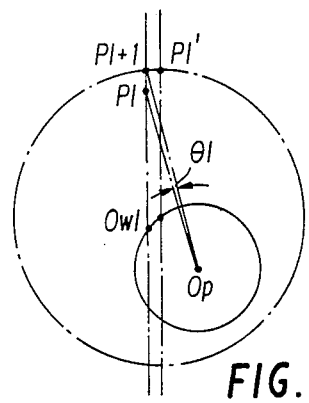
FIG. 7 is a view illustrating an embodiment of the present invention.

First, the welding torch and the teaching roller are attached to the fore end of the wrist portion of the robot body, and the control device is selected to the teaching mode. The work is fixed to the positioner turntable, which in turn is rotated at a desired speed. Then, the robot body whose arm or the like is operated manually or automatically and the teaching roller is pushed against the workpiece and moved along the weld line while keeping the proper welding position, especially the target position of the welding torch and the torch angle. At this time, the positional data is sampled at each predetermined distance on the weld line, and at this time of sampling, the positional data on the shafts $S_1$–$S_6$ of the robot body and on the shaft 22 of the turntable are detected by the respective position detectors and stored in memory means through a computer. The sampling is performed, for example, as shown in FIG. 7. In the same figure, if the teaching roller is put on the workpiece at point Pi and this point Pi moves to point Pi', and if the predetermined distance is l (e.g. l=2~3 mm) and the operator lets the teaching roller follow up only vertically without moving it in the transverse direction, then the roller rolls by only Pi+1Pi'. When Pi+1Pi' becomes equal to l, the teaching roller provides a sampling signal to the control device. Upon receipt of this sampling signal, the control device receives positional data which is provided at all times from the position detectors (seven detectors) and stores it in the memory means as data in the sampled position. Teaching is completed by successively executing these working steps. In FIG. 7, the mark Op denotes the center of rotation of the positioner, Owi denotes the center of the workpiece in a certain sampling, Pi denotes the position of the teaching roller in a certain sample, Pi+1 denotes the teaching position in the next sampling, Pi' denotes the position of point Pi in the next sampling, and $\theta i$ denotes an angle of rotation of the positioner until the next sampling.

On the other hand, in playback, predetermined programmed processing is performed by means of a computer on the basis of the data obtained by the above-described teaching operation, whereby while controlling the relative position between the workpiece and the welding torch, the moving speed of the welding torch and the rotating speed of the positioner are controlled simultaneously so that the welding speed is kept constant. The welding speed is preset by a data setting device according to the type of weld line.

Referring again to FIG. 7, if a preset value of welding speed is Vc (cm/min) and the output cycle of a target value is Tc (ms), the control device effects positioning of the robot body and the positioner successively at the sampling points Pi and Pi+1. Positioning the positioner means that, after Tc(ms), the turntable is rotated by $<$PiOpPi+1$=\theta i$, and positioning the robot body means that the torch is moved from Pi to Pi+1. Here, if the playback speed is set at 50 cm/min (ordinary welding speed), Tc becomes equal to 276 (ms), so if the position control is made at each cycle, it is possible that the movement of the robot and that of the positioner will lack smoothness. Preferably, therefore, the position control cycle is set at To (ms) and then N is determined which satisfies the following equation:

$$Tc = NTo + T_R = (N-1)To + (To + T_R)$$

wherein $T_R$ is a remainder of Tc/To, $To > T_R$, then the target value of position is divided in N with respect to both the robot body and the positioner, and each sampled position data is subjected to linear interpolation to attain smooth control.

It goes without saying that during playback control the speed at which the welding torch follows up an arc welding point and the rotating speed of the positioner turntable change momentarily.

Figure 8A:
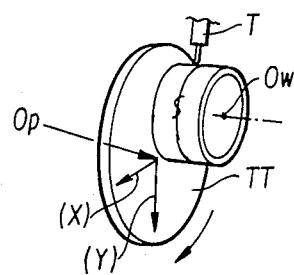
Figure 8B:
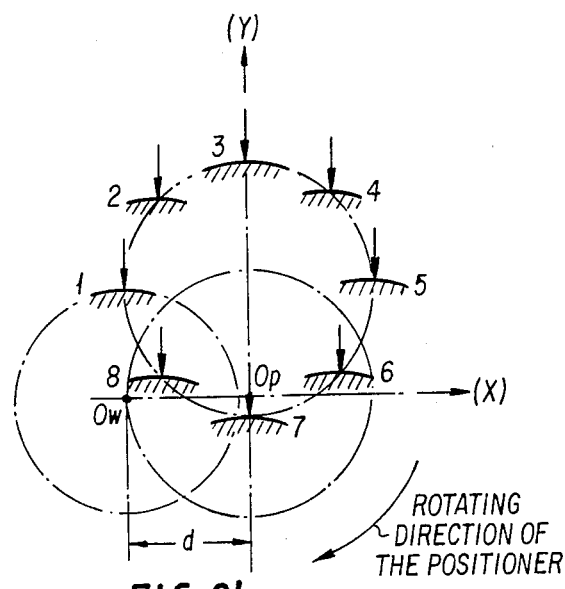
Figure 9A:
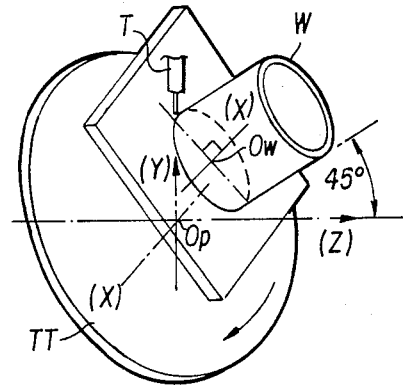
FIG. 9(a) shows fillet welding and FIG. 9(b) shows its locus.
Figure 9B:
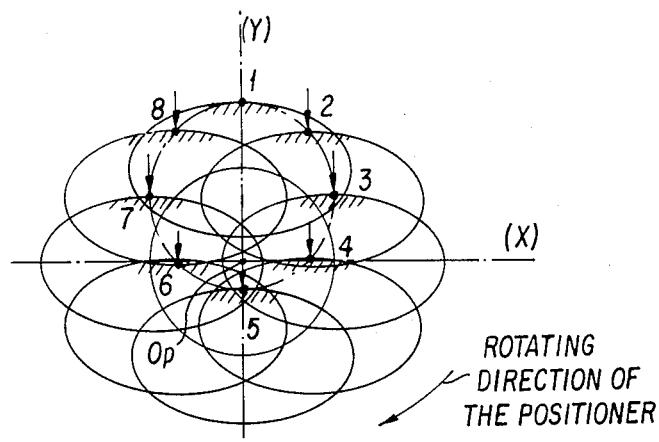
Figure 10A:
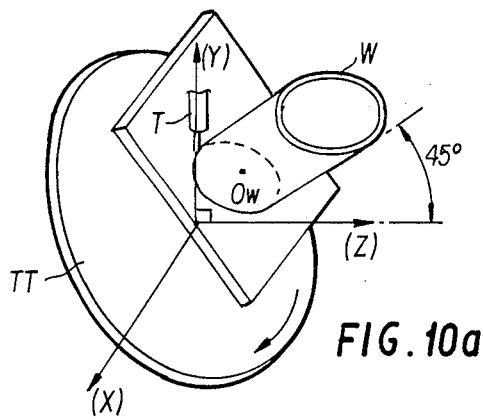
Figure 10B:
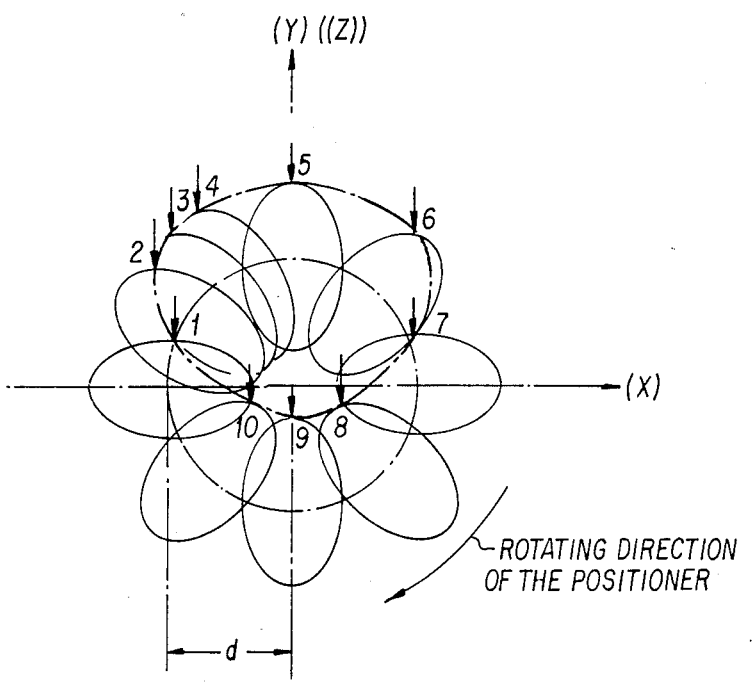

Referring now to FIGS. 8(a) to 10(b), there are shown concrete examples using the method of this embodiment. FIG. 8(a) shows butt welding of two cylinders wherein the welding torch faces downward, and FIG. 8(b) shows the locus of the tip end of the torch with movement of the robot (shown in an alternate long and short dash line, the sequence being 1→2→...→8). FIG. 9(a) shows fillet welding of a cylinder, and FIG. 9(b) shows the locus of the tip end of the torch. FIG. 10(a) shows fillet welding of an elliptical cylinder, and FIG. 10(b) shows the locus of the tip end of the torch to be followed up by the robot. In these figures, T denotes a torch, W a workpiece, TT a turntable, Op a rotational center of the turntable, Ow the center off weld line, d an amount of deviation between the rotational center Op and the center Ow, and the arrow ↓ denotes a target position of the welding torch T.

According to the present invention, as set forth hereinbefore, the shaft of the positioner turntable is constituted equally to the shafts of the robot, positional data of both the robot and the positioner are taken in at the time of teaching operation and control is made on the basis of an operational processing of those positional data during playback, so that the position of the robot and that of the positioner can be controlled relatively interlockingly and at the same time it is possible to perform welding while allowing for even speed control in addition to the positional control. Consequently, it is possible to weld even complicated curved lines other than a circle while rotating the turntable of the positioner in a relatively simple welding position regardless of the mounting position of a workpiece with respect to the turntable.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method of interlockingly controlling a robot, having a plurality of shafts, and a positioner with each other and utilizing a teaching roller and a rotatable positioner having a rotating shaft, which comprises:
    operating said teaching roller along a weld line of a workpiece fixed to said rotatable positioner;
    teaching the position of the weld line;
    storing the positional data thereby obtained; and performing a welding operation automatically on the basis of the stored data during playback, and which further comprises rotating the positioner at any desired speed during teaching; moving the robot manually or automatically while maintaining a welding torch in a proper welding position with respect to the weld line and storing positional data related to each shaft of the robot and related to a rotating shaft of the positioner each time the teaching roller advances by a predetermined distance, while maintaining the welding speed constant by controlling the moving speed of the robot and the rotating speed of the positioner simultaneously while controlling a relative positional relation between the positioner and the robot on the basis of said positional data related to each shaft of the robot and related to the rotating shaft of the positioner.

2. The method of claim 1, wherein said robot further comprises a multi-articulate teaching/playback robot having a plurality of shafts.

3. The method of claim 1, further comprising a control device wherein said each shaft of the robot and said rotating shaft of the positioner are provided with a position detector and which further comprises detecting positional data on each of said shafts and feeding positional data detected to said control device.

4. The method of claim 1, wherein said teaching roller is attached to a fore end portion of a wrist portion of the robot body and is provided with a photo detector portion and through holes formed at predetermined intervals and which further comprises producing an electrical pulse via said teaching roller each time one of said through holes passes across said photo detector portion.

* * * * *